Dec. 21, 1926.

E. ALDEBORGH

GAUGE

Filed Dec. 12, 1925

INVENTOR

Erik Aldeborgh

BY

ATTORNEYS

Patented Dec. 21, 1926.

1,611,578

UNITED STATES PATENT OFFICE.

ERIK ALDEBORGH, OF POUGHKEEPSIE, NEW YORK, ASSIGNOR TO STANDARD GAGE CO. INC., OF POUGHKEEPSIE, NEW YORK, A CORPORATION OF NEW YORK.

GAUGE.

Application filed December 12, 1925. Serial No. 75,108.

The object of my invention is to provide a gauge of the dial indicator type which will be gearless and which will also be very simple in construction, positive and accurate in operation and capable of withstanding the hard usage to which gauges of this type are commonly subjected.

A further object of my invention is to provide certain improvements in the construction, form and arrangement of the several parts whereby the working parts of the gauge are wholly supported by a separable casing back, for facilitating the removal of the parts for inspection and replacement, said casing back also being provided with an integral depending hollow lug for slidably mounting the gauge plunger and with integral stops for limiting the inward and outward movements of the plunger.

A practical embodiment of my invention is represented in the accompanying drawings, in which—

Figure 1:
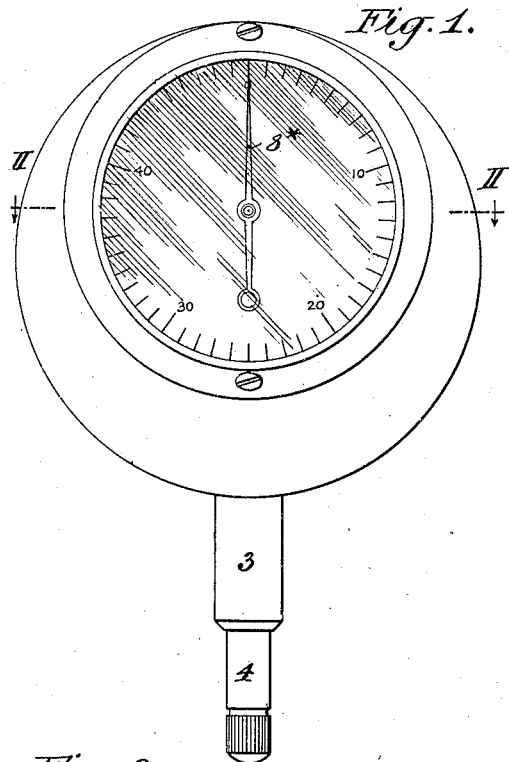
Fig. 1 represents the gauge in front elevation.
Figure 3:
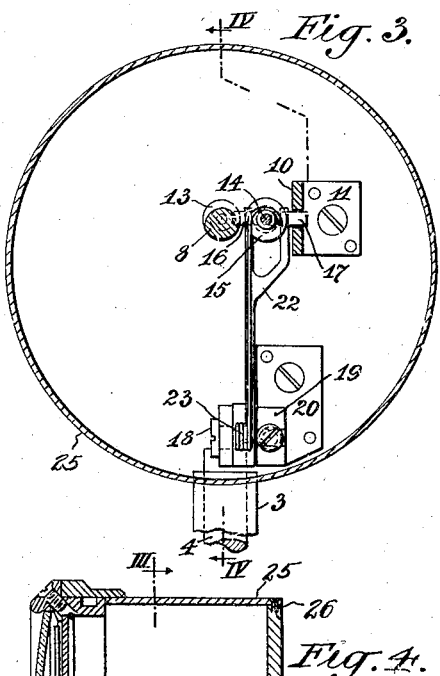
Fig. 3 represents a transverse vertical section taken in the plane of the line III—III of Fig. 4.
Figure 2:
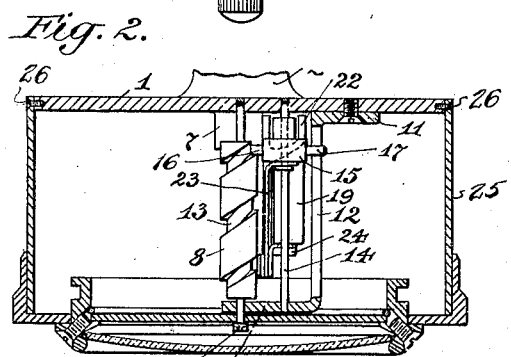
Fig. 2 represents a horizontal section taken in the plane of the line II—II of Fig. 1.
Figure 4:
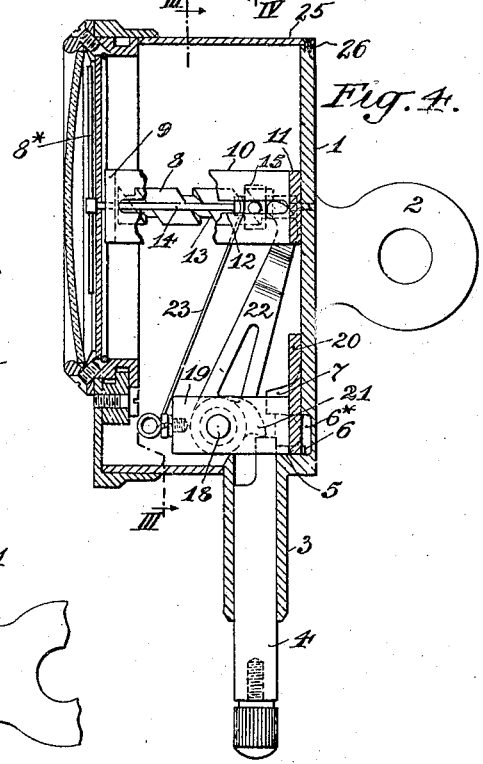
Fig. 4 represents a vertical longitudinal section taken in the planes of the line IV—IV of Fig. 3.
Figure 5:
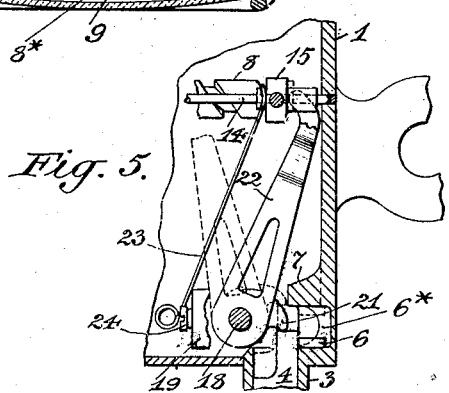
Fig. 5 represents a detail section showing the rock lever and plunger in full lines in their normal position and in dotted lines in the positions they assume when the plunger has been moved to the limit of its inward movement.

The separable back 1 of the casing is provided with an integral ear 2 for attaching the gauge to a suitable standard. This casing back is also provided with an integral depending hollow lug 3 for slidably mounting the gauge plunger 4. The casing back is provided with integral stops for limiting the inward and outward movements of the plunger 4, the shoulder 5 at the inner end of the hollow lug 3 being arranged in position to engage a pin 6 projecting laterally from the inner end of the plunger 4 to act as the stop for limiting the outward movement of the plunger and a lug 7 projecting from the casing back 1 being arranged in position to act as the stop for engaging the inner end of the plunger 4 to limit its inward movement.

The pin 6 travels in a recess 6* in the casing back for preventing the plunger from turning.

The indicating hand 8* of the gauge is fastened to the hand arbor 8, which hand arbor 8 is mounted at its rear end in the casing back 1 and at its front end in a front lateral branch 9 of a bracket 10, the back lateral branch 11 of which is secured to the casing back 1. This bracket has an elongated slot 12 extending parallel to the hand arbor 8.

The hand arbor 8 is provided with an enlarged cylindrical portion between its ends, which cylindrical portion has a spiral groove 13 along the same.

A rod 14 is spaced from and arranged parallel to the hand arbor 8, which rod is supported at its rear end in the casing back 1 and at its front end in the front lateral branch 9 of the bracket 10. This rod forms a support for a slidable sleeve 15 which is provided with oppositely arranged projections 16 and 17, the projection 16 being located within the spiral groove 13 of the hand arbor and the projection 17 being located in the elongated groove 12 of the bracket 10, to prevent the sleeve from turning as it is moved along the rod 14 to rotate the hand arbor.

A rock lever is pivoted at 18 in a forwardly projecting branch 19 of the bracket 20, secured to the casing back 1, the short arm 21 of which lever is engaged by the inner end of the plunger 4 and the long arm 22 of which lever engages the back of the slidable sleeve 15, to move it forwardly along the rod 14 as the plunger is moved inwardly. This long arm 22 is preferably bifurcated so that the free ends of its branches will press equally against the back of the sleeve upon opposite sides of the rod 14 to prevent any tendency of the sleeve to cramp or bind on the rod.

A spring 23 is secured at 24 to the front end of the bracket branch 19, the free end of which spring engages the front of the slidable sleeve 15 to reverse its movement and thereby return the parts to their normal position when the plunger 4 is released.

The back 1 is shown as removably secured around its periphery to the cylindrical side wall 25 of the casing by screws 26.

From the above description it will be seen that a very simple mechanism is provided for operatively connecting the hand of the gauge to the plunger. It will also be seen that all of the working parts are carried by the separable casing back, the supports for the parts at the same time being made very strong and durable.

It is evident that various changes may be resorted to in the construction, form and arrangement of the several parts without departing from the spirit and scope of my invention; hence, I do not intend to be limited to the particular embodiment herein shown and described, but

What I claim is:—

1. In a gauge of the dial indicator type, a hand arbor having a spiral groove, a plunger and an operating connection between the plunger and arbor comprising a suitable support, a sleeve slidable along the same parallel to the arbor and engaging said spiral groove, means for preventing the sleeve from turning, a rock lever having a short arm engaged by said plunger and a long arm engaging said sleeve, and a spring for returning the parts to their normal positions.

2. In a gauge of the dial indicator type, a hand arbor having a spiral groove, a plunger movable in a straight line at right angles to said arbor and an operating connection between the plunger and arbor comprising a suitable support, a sleeve slidable along the same parallel to the arbor and engaging said spiral groove, means for preventing the sleeve from turning, a rock lever having a short arm engaged by said plunger and a long arm engaging said sleeve, and a spring for returning the parts to their normal positions.

3. In a gauge of the dial indicator type, a hand arbor having a spiral groove, a plunger and an operating connection between the plunger and arbor comprising a rod arranged parallel to the arbor, a bracket having an elongated slot arranged parallel to said rod, a sleeve slidable on said rod having a projection located in said spiral groove and a projection located in said slot for preventing the sleeve from turning, a rock lever having a short arm engaged by the plunger and a long arm engaging the back of the sleeve to press it forward, and a spring engaging the front of the sleeve to press it back for returning the parts to their normal positions.

4. In a gauge of the dial indicator type, a hand arbor having a spiral groove, a plunger movable in a straight line at right angles to said arbor and an operating connection between the plunger and arbor comprising a rod arranged parallel to the arbor, a bracket having an elongated slot arranged parallel to said rod, a sleeve slidable on said rod having a projection located in said spiral groove and a projection located in said slot for preventing the sleeve from turning, a rock lever having a short arm engaged by the plunger and a long arm engaging the back of the sleeve to press it forward, and a spring engaging the front of the sleeve to press it back for returning the parts to their normal positions.

5. In a gauge of the dial indicator type, a casing having a separable back provided with an integral depending hollow lug, a hand arbor, a plunger slidable in said lug and an operating connection between said plunger and arbor, said casing back having integral stops for limiting the inward and outward movements of the plunger and also serving as the sole support for the said arbor, plunger and operating connection.

6. In a gauge of the dial indicator type, a casing having a separable back provided with an integral depending hollow lug, a hand arbor, a plunger slidable in said lug in a straight line at right angles to said arbor, and an operating connection between said plunger and arbor, said casing back having integral stops for limiting the inward and outward movements of the plunger and also serving as the sole support for the said arbor, plunger and operating connection.

7. In a gauge of the dial indicator type, a casing having a separable back provided with an integral depending hollow lug, a hand arbor having a spiral groove, a plunger slidable in said hollow lug and an operating connection betwen the plunger and arbor comprising a rod arranged parallel to the arbor, a bracket having an elongated slot arranged parallel to said rod, a sleeve slidable on said rod having a projection located in said spiral groove and another projection located in said slot for preventing the sleeve from turning, a rock lever having a short arm engaged by the plunger and a long arm engaging the sleeve to move it forward and a spring engaging said sleeve to reverse its movement for returning the parts to their normal positions, said casing back being provided with integral stops for limiting the inward and outward movements of the plunger and also serving as the sole support for the said parts.

8. In a gauge of the dial indicator type, a casing having a separable back provided with an integral depending hollow lug, a hand arbor having a spiral groove, a plunger slidable in said hollow lug in a straight line at right angles to said arbor and an operating connection between the plunger and arbor comprising a rod arranged parallel to the arbor, a bracket having an elongated slot arranged parallel to said rod, a sleeve slidable on said rod having a projection located in said spiral groove and another projection located in said slot for preventing the sleeve from turning, a rock lever having a short arm engaged by the plunger and a long arm engaging the sleeve to move it forward, and a spring engaging said sleeve to reverse its movement for returning the parts to their normal positions, said casing back being provided with integral stops for limiting the inward and outward movements of the plunger and also serving as the sole support for the said parts.

In testimony, that I claim the foregoing as my invention, I have signed my name this seventh day of December, 1925.

ERIK ALDEBORGH.